(12) United States Patent
He (10) Patent No.: US 11,487,178 B2
(45) Date of Patent: Nov. 1, 2022

(54) DISPLAY PANEL AND DISPLAY DEVICE

(71) Applicant: HKC CORPORATION LIMITED, Shenzhen (CN)

(72) Inventor: HuaiLiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/258,169

(22) PCT Filed: Dec. 14, 2018

(86) PCT No.: PCT/CN2018/121011
§ 371 (c)(1),
(2) Date: Jan. 6, 2021

(87) PCT Pub. No.: WO2020/113652
PCT Pub. Date: Jun. 11, 2020

(65) Prior Publication Data
US 2021/0232011 A1     Jul. 29, 2021

(30) Foreign Application Priority Data
Dec. 4, 2018    (CN) .......................... 201822026100.8

(51) Int. Cl.
*G02F 1/1362*      (2006.01)
*G02F 1/1368*      (2006.01)

(52) U.S. Cl.
CPC ...... *G02F 1/136286* (2013.01); *G02F 1/1368* (2013.01)

(58) Field of Classification Search
CPC ................................................ G02F 1/136286
See application file for complete search history.

(56) References Cited

U.S. PATENT DOCUMENTS

| 6,011,531 A | 1/2000 | Mei et al. | |
|---|---|---|---|
| 2014/0049619 A1* | 2/2014 | Hsieh ................ | H04N 13/315 348/51 |

(Continued)

FOREIGN PATENT DOCUMENTS

| CN | 102117602 | * | 7/2011 | ............ G02F 1/133 |
|---|---|---|---|---|
| CN | 102117602 A | | 7/2011 | |

(Continued)

OTHER PUBLICATIONS

Jue Wang, the ISA written comments, Aug. 2019, CN.
Jue Wang, the International Search Report, dated Aug. 2019, CN.

*Primary Examiner* — Sang V Nguyen (57) ABSTRACT

This application discloses a display panel and a display device. The display panel includes: a first substrate; a plurality of pixels arranged on the first substrate and including a first pixel and a second pixel; a plurality of data lines and a plurality of scanning lines arranged on the first substrate; a spacer standing portion arranged between two adjacent data lines and at an intersection of four adjacent pixels; and a spacer arranged corresponding to the spacer standing portion. The first pixel and the second pixel are connected to the $n^{th}$ row of data lines and the $n^{th}$ row of scanning lines. The first pixel includes a first main pixel and a first auxiliary pixel arranged adjacent to each other. The second pixel includes a second main pixel and a second auxiliary pixel arranged adjacent to each other.

20 Claims, 5 Drawing Sheets

(56) References Cited

U.S. PATENT DOCUMENTS

| | | | | |
|---|---|---|---|---|
| 2015/0002561 A1* | 1/2015 | Yao | ............... | G09G 3/3659 345/694 |
| 2015/0185566 A1* | 7/2015 | Choi | ............... | G02F 1/1368 438/30 |
| 2016/0139444 A1* | 5/2016 | Zhang | ............... | G02F 1/13439 257/72 |
| 2016/0327819 A1* | 11/2016 | Chao | ............... | G09G 3/3648 |
| 2017/0160616 A1* | 6/2017 | Kim | ............... | G02F 1/133345 |
| 2017/0184927 A1* | 6/2017 | Ho | ............... | G02F 1/133707 |

FOREIGN PATENT DOCUMENTS

| | | | | |
|---|---|---|---|---|
| CN | 102902120 A | 1/2013 | | |
| CN | 104749823 A | 7/2015 | | |
| CN | 104808406 A | 7/2015 | | |
| CN | 107479258 | * 12/2017 | ............ | G02F 1/1333 |
| CN | 107479258 A | 12/2017 | | |

\* cited by examiner

DISPLAY PANEL AND DISPLAY DEVICE

CROSS REFERENCE OF RELATED APPLICATIONS

This application claims the priority to the Chinese Patent Application No. 201822026100.8, filed with National Intellectual Property Administration, PRC on Dec. 4, 2018 and entitled "DISPLAY PANEL AND DISPLAY DEVICE", which is incorporated herein by reference in its entirety.

TECHNICAL FIELD

This application relates to the technical field of display, and in particular, to a display panel and a display device.

BACKGROUND

The statements herein only provide background information related to this application, and do not necessarily constitute the prior art.

With the rapid development of science and technology and continuous improvement of people's living standards, requirements for the display level of a display panel also become increasingly higher. A thin film transistor-liquid crystal display (TFT-LCD) has gradually occupied a dominant position in the display field due to performance such as low power consumption, excellent picture quality, high production yield, and the like.

However, the display panel has uneven luminance, which affects the viewing experience. Therefore, it is quite important to find an effective solution to the uneven display of the display panel.

SUMMARY

The purpose of this application is to provide a display panel and a display device, so as to resolve the problem of uneven display of the display panel.

In order to achieve the foregoing purpose, this application provides a display panel, including:

a first substrate; a plurality of pixels arranged on the first substrate and including a first pixel and a second pixel;

a plurality of data lines arranged on the first substrate; a plurality of scanning lines arranged on the first substrate; a spacer standing portion arranged between two adjacent data lines and at an intersection of four adjacent pixels; and a spacer arranged corresponding to the spacer standing portion. The first pixel and the second pixel are connected to the $n^{th}$ row of data lines and the $n^{th}$ row of scanning lines. The first pixel includes a first main pixel and a first auxiliary pixel arranged adjacent to each other. The second pixel includes a second main pixel and a second auxiliary pixel arranged adjacent to each other.

Optionally, a common electrode line is arranged between the second pixel of the $n^{th}$ row of data lines and the first pixel of the $(n+1)^{th}$ of data lines along the scanning line on the first substrate. The spacer standing portion is located at an intersection of the scanning line and the common electrode line and is arranged on the scanning line.

Optionally, the common electrode line is disconnected at the intersection of the common electrode line and the scanning line.

Optionally, the common electrode line is connected through a via at the intersection of the common electrode line and the scanning line.

Optionally, the first main pixel includes a first main pixel electrode, and the first auxiliary pixel includes a first auxiliary pixel electrode. The second main pixel includes a second main pixel electrode, and the second auxiliary pixel includes a second auxiliary pixel electrode. The first main pixel electrode, the first auxiliary pixel electrode, the second main pixel electrode, and the second auxiliary pixel electrode respectively include a horizontal backbone parallel to the scanning line and located corresponding to a position of the scanning line. The common electrode line includes a first common electrode line and a second common electrode line. The first common electrode line is parallel to the data line and arranged between the second pixel of the $n^{th}$ row of data lines and the $(n+1)^{th}$ row of data lines along the scanning line. The second common electrode line is overlapped with the horizontal backbone and in communication with at least two first common electrode lines.

Optionally, a common electrode line is arranged between the second pixel of the $n^{th}$ row of data lines and the first pixel of the $(n+1)^{th}$ row of data lines along the scanning line on the first substrate. The spacer standing portion is located at an intersection of the scanning line and a common electrode line and is arranged on the common electrode line. The scanning lines on two sides of the spacer standing portion are connected to each other through a via.

Optionally, the first main pixel includes a first main switch, the first auxiliary pixel includes a first auxiliary switch, the second main pixel includes a second main switch, and the second auxiliary pixel includes a second auxiliary switch. The first auxiliary switch, the second auxiliary switch, the first main switch, and the second main switch are adjacently arranged at a position corresponding to the $n^{th}$ row of data lines on the $n^{th}$ row of scanning lines. A common electrode line is arranged between the second pixel of the $n^{th}$ row of data lines and the first pixel of the $(n+1)^{th}$ row of data lines along the scanning line on the first substrate. The spacer is arranged on the common electrode line.

Optionally, the first main pixel includes a first main switch, the first auxiliary pixel includes a first auxiliary switch, the second main pixel includes a second main switch, and the second auxiliary pixel includes a second auxiliary switch. The display panel further includes an auxiliary spacer standing portion.

The auxiliary spacer standing portion is formed by adjacently arranging the first auxiliary switch, the second auxiliary switch, the first main switch, and the second main switch at an intersection of the $n^{th}$ row of scanning lines and the $n^{th}$ row of data lines.

Optionally, the spacer standing portion is arranged at the intersection of the scanning line and the data line at intervals along the data line.

Optionally, the spacer standing portion is arranged at the intersection of the scanning line and the data line at intervals along the scanning line.

Optionally, the first auxiliary pixel is connected to a first pull-down circuit configured to pull down a charging voltage of the first auxiliary pixel, and the second auxiliary pixel is connected to a second pull-down circuit configured to pull down a charging voltage of the second auxiliary pixel. The first pull-down circuit and the second pull-down circuit have different pull-down effects.

Optionally, the first auxiliary pixel includes a first auxiliary pixel electrode, the first pull-down circuit being arranged between the first auxiliary pixel electrode and a next row of scanning Optionally, a common electrode line is arranged between the second pixel of the $n^{th}$ row of data lines and the first pixel of the $(n+1)^{th}$ row of data lines along the scanning line on the first substrate. The first auxiliary pixel includes a first auxiliary pixel electrode. The first pull-down circuit is arranged between the first auxiliary pixel electrode and a common electrode line.

Optionally, the second auxiliary pixel includes a second auxiliary pixel electrode, the second pull-down circuit being arranged between the second auxiliary pixel electrode and a next row of scanning lines.

Optionally, a common electrode line is arranged between the second pixel of the $n^{th}$ row of data lines and the first pixel of the $(n+1)^{th}$ row of data lines along the scanning line on the first substrate. The second auxiliary pixel includes a second auxiliary pixel electrode. The second pull-down circuit is arranged between the second auxiliary pixel electrode and a common electrode line.

Optionally, the first main pixel includes a first main pixel electrode, and the second main pixel includes a second main pixel electrode, the first main pixel electrode and the second main pixel electrode having different patterns.

Optionally, the first auxiliary pixel includes a first auxiliary pixel electrode, and the second auxiliary pixel includes a second auxiliary pixel electrode, the first auxiliary pixel electrode and the second auxiliary pixel electrode having different patterns.

Optionally, leakage currents of the first main switch and the second main switch are different. Leakage currents of the first auxiliary switch and the second auxiliary switch are different.

This application further discloses a display panel, including: a first substrate; a plurality of pixels arranged on the first substrate and including a first pixel and a second pixel; a plurality of data lines arranged on the first substrate; a plurality of scanning lines arranged on the first substrate; a common electrode line arranged on the first substrate and between the second pixel of the $n^{th}$ row of data lines and the first pixel of the $(n+1)^{th}$ row of data lines along the scanning line; a spacer standing portion arranged between two adjacent data lines and at an intersection of four adjacent pixels, located at an intersection of the scanning line and the common electrode line, and arranged on the scanning line; and a spacer arranged corresponding to the spacer standing portion. The first pixel and the second pixel are connected to the $n^{th}$ row of data lines and the $n^{th}$ row of scanning lines. The first pixel includes a first main pixel and a first auxiliary pixel arranged adjacent to each other. The second pixel includes a second main pixel and a second auxiliary pixel arranged adjacent to each other. The first main pixel includes a first main pixel electrode, and the first auxiliary pixel includes a first auxiliary pixel electrode. The second main pixel includes a second main pixel electrode, and the second auxiliary pixel includes a second auxiliary pixel electrode. The first main pixel electrode, the first auxiliary pixel electrode, the second main pixel electrode, and the second auxiliary pixel electrode include a horizontal backbone horizontally arranged and located corresponding to a position of the scanning line. The common electrode line includes a first common electrode line and a second common electrode line. The first common electrode line is parallel to the data line and arranged between the second pixel of the $n^{th}$ row of data lines and the $(n+1)^{th}$ row of data lines along the scanning line. The second common electrode line is overlapped with the horizontal backbone and in communication with at least two first common electrode lines.

This application further discloses a display device including a display panel, the display panel including:

a first substrate; a plurality of pixels arranged on the first substrate and including a first pixel and a second pixel; a plurality of data lines arranged on the first substrate; a plurality of scanning lines arranged on the first substrate; a spacer standing portion arranged between two adjacent data lines and at an intersection of four adjacent pixels; and a spacer arranged corresponding to the spacer standing portion. The first pixel and the second pixel are connected to the $n^{th}$ row of data lines and the $n^{th}$ row of scanning lines.

The first pixel includes a first main pixel and a first auxiliary pixel arranged adjacent to each other. The second pixel includes a second main pixel and a second auxiliary pixel arranged adjacent to each other.

In this solution, since the first main pixel and the first auxiliary pixel of the first pixel and the second main pixel and the second auxiliary pixel of the second pixel are connected to the same data line and the same scanning line, the data lines are reduced. The data lines are arranged at intervals, so that space is freed up for arranging the spacer standing portion at the intersection of the four pixels and between adjacent data lines. By arranging a spacer to improve luminance unevenness (Mura), the loss of aperture ratios is reduced, which effectively improves the standing position of the spacer in the display panel, so that the display effect and quality of the display panel can be improved.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Obviously, the accompanying drawings in the following descriptions are merely some embodiments of this application, and a person of ordinary skill in the art may further obtain other accompanying drawings according to the accompanying drawings without creative efforts. In the accompanying drawings.

DETAILED DESCRIPTION OF EMBODIMENTS

It should be understood that, the terms used herein, specific structures, and functional details disclosed herein are intended to describe specific embodiments and merely representative. However, this application may be specifically implemented in many alternative forms, and should not be construed as being limited to the embodiments set forth herein.

In the descriptions of this application, the terms such as "first" and "second" are used only for the purpose of description, and should not be understood as indicating or implying the relative importance or implicitly specifying the number of the indicated technical features. Therefore, unless otherwise specified, a feature limited by "first" or "second" may explicitly or implicitly include one or more of the features. "Multiple" means two or more. The terms "include", "comprise" and any variant thereof are intended to cover non-exclusive inclusion. One or more other features, integers, steps, operations, elements, components, and/or a combination thereof may be present or added.

In addition, orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating that the mentioned apparatus or component must have a particular orientation or must be constructed and operated in a particular orientation. Therefore, such terms should not be construed as limiting of this application.

In addition, unless otherwise explicitly specified or defined, the terms such as "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two component. Persons of ordinary skill in the art may understand the specific meanings of the foregoing terms in this application according to specific situations.

Figure 1:
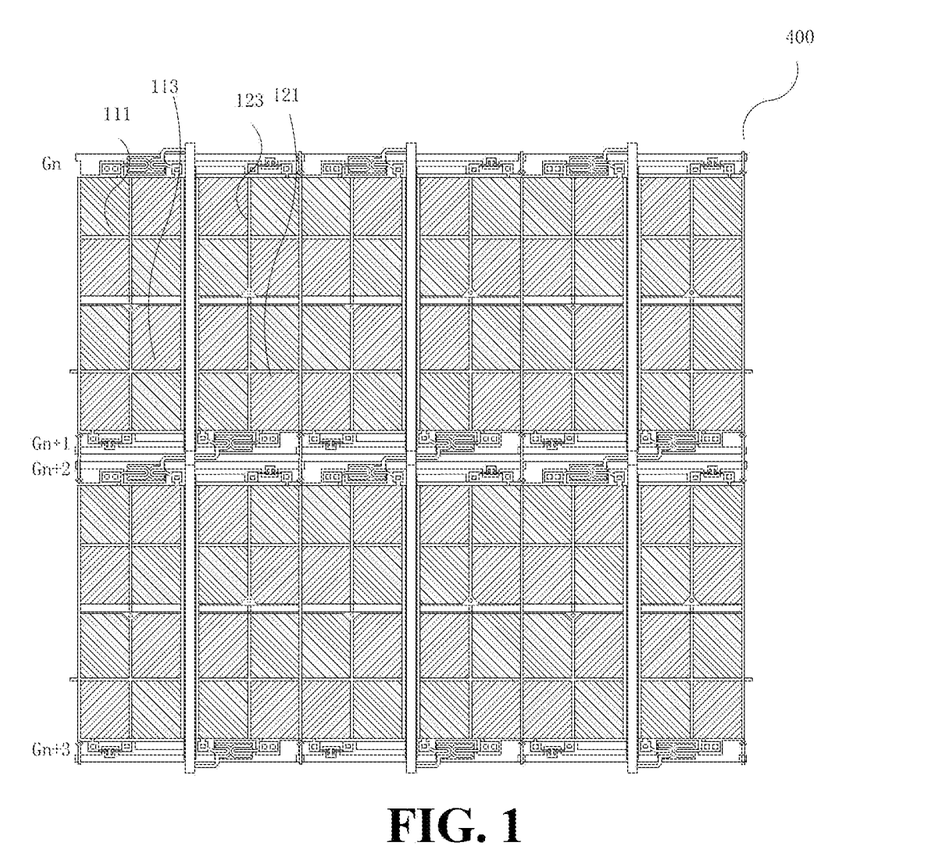
FIG. 1 is a schematic structural diagram of a display panel according to an embodiment of this application.
Figure 2:
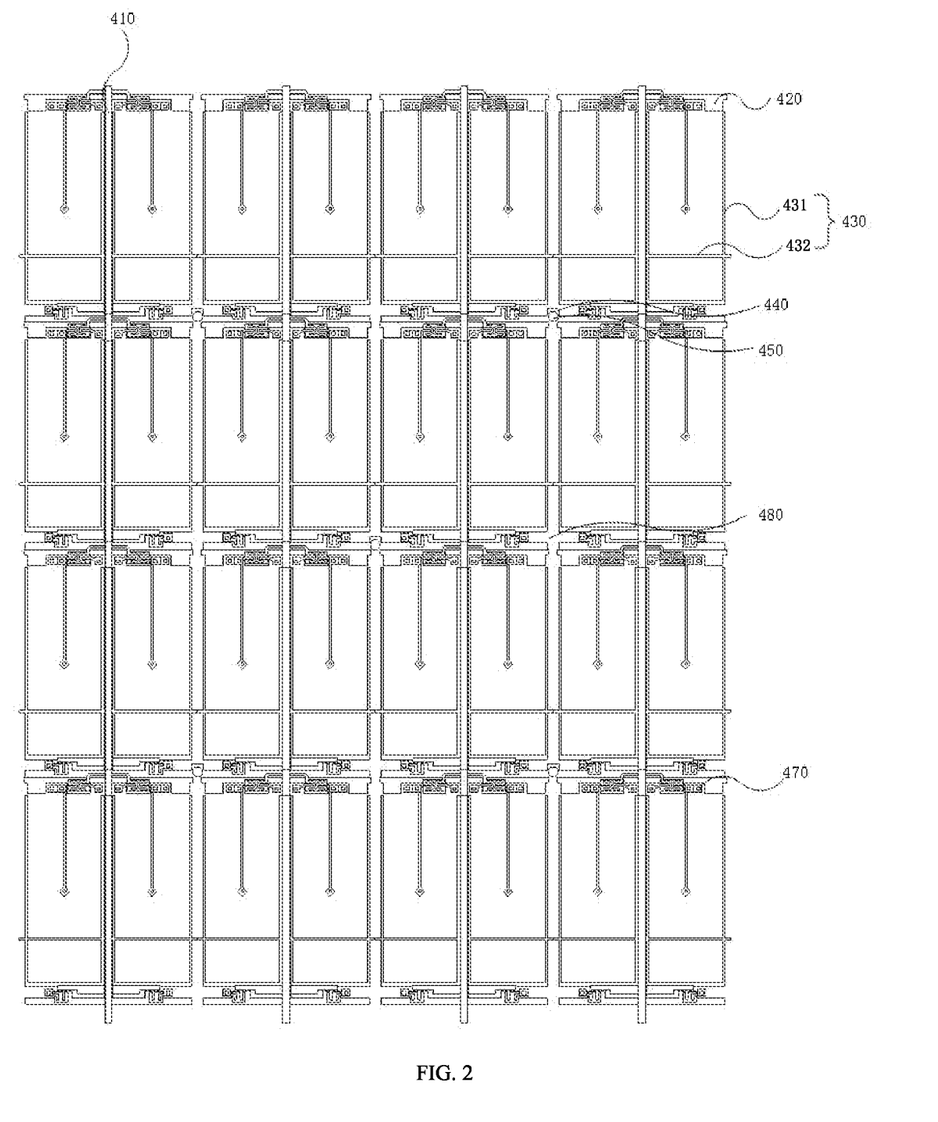
FIG. 2 is a schematic structural diagram of another display panel according to an embodiment of this application.

Although double rate driving (DRD) low color shift design effectively improves the color shift, there is no position of a spacer without reducing the aperture ratio due to too many scanning lines, as shown in FIG. 1.

Figure 3:
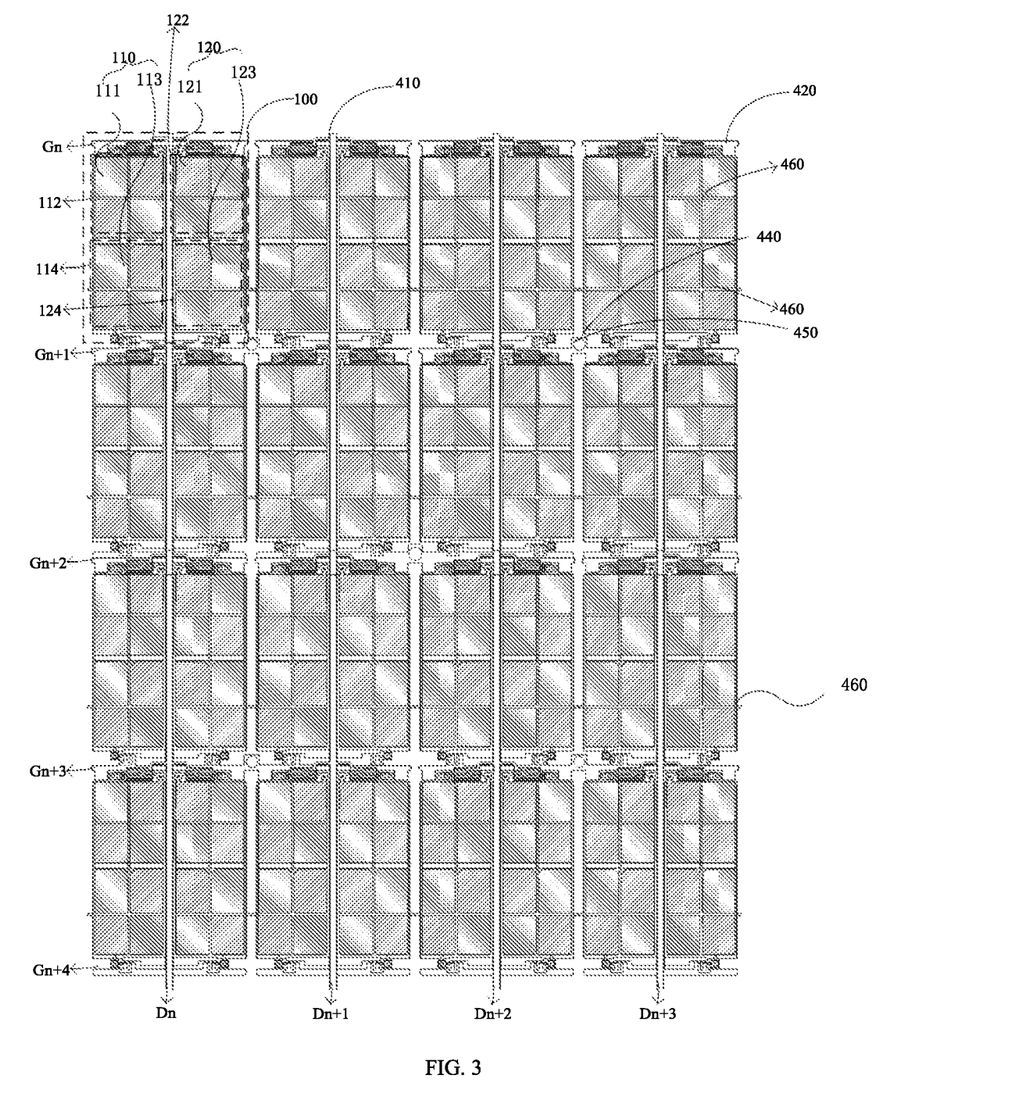
FIG. 3 is a schematic structural diagram of another display panel according to an embodiment of this application.

A new type of double rate driving (DRD) low color shift design can design the position of the spacer while keeping the aperture ratio unchanged, as shown in FIG. 3.

This application is described below with reference to the accompanying drawings and optional embodiments.

As shown in FIG. 1 to FIG. 5, an embodiment of this application discloses a display panel, including: a first substrate 400; a plurality of pixels 100 arranged on the first substrate 400 and including a first pixel 110 and a second pixel 120; a plurality of data lines 410 arranged on the first substrate 400; a plurality of scanning lines 420 arranged on the first substrate 400; a spacer standing portion 440 arranged between two adjacent data lines 410 and at an intersection of four adjacent pixels 100; and a spacer 450 arranged corresponding to the spacer standing portion 440. The first pixel 110 and the second pixel 120 are connected to the $n^{th}$ row of data lines 410 and the $n^{th}$ row of scanning lines 420. The first pixel 110 includes a first main pixel 111 and a first auxiliary pixel 113 arranged adjacent to each other. The second pixel 120 includes a second main pixel 121 and a second auxiliary pixel 123 arranged adjacent to each other. In this solution, since the first main pixel 111 and the first auxiliary pixel 113 of the first pixel 110 and the second main pixel 121 and the second auxiliary pixel 123 of the second pixel 120 are connected to the same data line and the same scanning line 420, the data lines 410 are reduced. The data lines 410 are arranged at intervals, so that space is freed up for arranging the spacer standing portion 440 at the intersection of the four pixels 100 and between adjacent data lines 410. A spacer 450 is arranged to improve uneven luminance (Mura) of a picture displayed by a display panel 200, and the loss of aperture ratios is reduced, which effectively improves the standing position of the spacer 450 in the display panel 200, so that the display effect and quality of the display panel 200 can be improved.

In one or more embodiments, a common electrode line 430 is arranged between the second pixel 120 of the $n^{th}$ row of data lines 410 and the first pixel 110 of the $(n+1)^{th}$ row of data lines 410 along the scanning line 420 on the first substrate 400. The spacer standing portion 440 is located at an intersection of the scanning line 420 and the common electrode line 430 and is arranged on the scanning line 420.

In this solution, the common electrode line 430 may be disconnected at the intersection or connected through a via 470 at the intersection. Since the intersection of the scanning line 420 and the common electrode line 430 should be shielded, the spacer standing portion 440 is arranged at the intersection. Therefore, especially a black spacer standing portion 440 and the spacer 450 may be used as a shielding layer or a part of the shielding layer, to shield the scanning line 420 and the common electrode line 430, which can shield light while avoiding the uneven luminance (Mura) of the displayed picture, thereby reducing loss of light transmittance of the display panel 200 caused by arranging the spacer 450. Certainly, other light-shielding layers may be additionally arranged at the intersections to shield the common electrode line 430, the scanning line 420, the spacer standing portion 440, and the spacer 450, and share the light-shielding layer to increase the light transmittance.

In one or more embodiments, the first main pixel 111 includes a first main pixel electrode 112, and the first auxiliary pixel 113 includes a first auxiliary pixel electrode 114. The second main pixel 121 includes a second main pixel electrode 122, and the second auxiliary pixel 123 includes a second auxiliary pixel electrode 124. The first main pixel electrode 112, the first auxiliary pixel electrode 114, the second main pixel electrode 122, and the second auxiliary pixel electrode 124 respectively include a horizontal backbone 460 parallel to the scanning line 420 and located corresponding to a position of the scanning line.

The common electrode line 430 includes a first common electrode line 431 and a second common electrode line 432. The first common electrode line 431 is parallel to the data line 410 and arranged between the second pixel 120 of the $n^{th}$ row of data lines 410 and the $(n+1)^{th}$ row of data lines 410 along the scanning line 420. The second common electrode line 432 is overlapped with the horizontal backbone 460 and in communication with at least two first common electrode lines 431, In this solution, since the first common electrode lines 431 are easily disconnected during connection through the via 470 at the intersection, or the first common electrode lines on upper and lower sides of the intersection are disconnected themselves, a horizontal second common electrode line 432 is arranged, and the first common electrode lines 431 are formed into mesh structures that are in communication with each other, to ensure the function of the common electrode line 430. In addition, since the second common electrode line 432 and the horizontal backbone 460 of each of the pixels 100 overlap and share a wiring space, the loss of light transmittance can be reduced, and the light transmittance can be increased. In this solution, three horizontal backbones 460 are arranged, and one of the horizontal backbones 460 overlaps the second common electrode line 432.

In one or more embodiments, a common electrode line 430 is arranged between the second pixel 120 of the $n^{th}$ row of data lines 410 and the first pixel 110 of the $(n+1)^{th}$ row of data lines 410 along the scanning line 420 on the first substrate 400. The spacer standing portion 440 is located at an intersection of the scanning line 420 and the common electrode line 430 and is arranged on the common electrode line 430. The scanning lines 420 on two sides of the spacer standing portion 440 are connected to each other through the via 470.

In this solution, a width of the common electrode line 430 itself is relatively large, which facilitates arrangement of the spacer standing portion 440. In addition, the horizontal scanning line 420 is arranged in this solution. Since the common electrode line 430 and the scanning line 420 are arranged on the same layer, in order to prevent the scanning line 420 and the common electrode line 430 from interfering with each other, a via 470 is arranged, so that the scanning lines 420 on two sides of the spacer standing portion 440 are connected to each other through the via 470.

In one or more embodiments, the first main pixel 111 includes a first main switch T1, the first auxiliary pixel 113 includes a first auxiliary switch T2, the second main pixel 121 includes a second main switch T4, and the second auxiliary pixel 123 includes a second auxiliary switch T5. The first auxiliary switch T2, the second auxiliary switch T5, the first main switch T1, and the second main switch T4 are adjacently arranged at a position close to the $n^{th}$ row of data lines 410 on the $n^{th}$ row of scanning lines 420.

A common electrode line 430 is arranged between the second pixel 120 of the $n^{th}$ row of data lines 410 and the first pixel 110 of the $(n+1)^{th}$ row of data lines 410 along the scanning line 420 on the first substrate 400. The spacer 450 is arranged on the common electrode line 430.

In this solution, since the first pixel 110 and the second pixel 120 are arranged close to the data line 410 and the scanning line 420, the corresponding first auxiliary switch T2, the second auxiliary switch T5, the first main switch T1, and the second main switch T4 are adjacently arranged at a position close to the $n^{th}$ row of data lines 410 on the $n^{th}$ row of scanning lines 420. Therefore, more space is freed up at the intersection of the common electrode line 430 between the two adjacent data lines 410 and the scanning line 420, to avoid the occupation of the space at the intersection by the arranged switch, so that after an ACOM is arranged, there is space for arranging the spacer standing portion 440 on the common electrode line 430 at the intersection. As a result, arrangement of the spacer standing portion 440 is improved.

In one or more embodiments, the first main pixel 111 includes a first main switch T1, the first auxiliary pixel 113 includes a first auxiliary switch T2, the second main pixel 121 includes a second main switch T4, and the second auxiliary pixel 123 includes a second auxiliary switch T5. The display panel 200 further includes an auxiliary spacer standing portion 480. The auxiliary spacer standing portion 480 is formed by adjacently arranging the first auxiliary switch T2, the second auxiliary switch T5, the first main switch T1, and the second main switch T4 at an intersection of the $n^{th}$ row of scanning lines 420 and the $n^{th}$ row of data lines 410.

In this solution, the first auxiliary switch T2, the second auxiliary switch T5, the first main switch T1, and the second main switch T4 are adjacently arranged at a position close to the $n^{th}$ row of data lines 410 the $n^{th}$ row of scanning lines 420, so that a standing portion can be arranged on a thin film transistor (TFT), and the TFT itself is relatively high, which can effectively reduce the material of the spacer 450. The thin film transistor has a larger line width relative to the scanning line 420 and the common electrode line 430, so as to avoid the situation that the spacer 450 falls due to incomplete alignment of the spacer 450 when arranged.

In one or more embodiments, the spacer standing portion 440 is arranged at the intersection of the scanning line 420 and the data line 410 at intervals along the data line 410. The spacer standing, portion 440 is arranged at the intersection of the scanning line 420 and the data line 410 at intervals along the scanning line 420.

In this solution, a spacer standing portion 440 is arranged at every two intersections, and spacers 450 corresponding to adjacent scanning lines 420 are arranged in a staggered manner. On the basis of reducing the data lines 410 and the scanning lines 420 to increase light transmittance, the spacer 450 is arranged to avoid uneven luminance (Mora) of the picture displayed by the display panel 200, and is arranged reasonably to increase the light transmittance of the display panel 200.

In one or more embodiments, the first auxiliary pixel 113 is connected to a first pull-down circuit 115 configured to pull down a charging voltage of the first auxiliary pixel 113, and the second auxiliary pixel 123 is connected to a second pull-down circuit 125 configured to pull down a charging voltage of the second auxiliary pixel 123. The first pull-down circuit 115 and the second pull-down circuit 125 have different pull-down effects.

In this solution, since the first pull-down circuit 115 and the second pull-down circuit 125 have different pull-down effects, under the control of the same scanning line 420 and when the same data signal is received, luminance of the first auxiliary pixel 113 and the second auxiliary pixel 123 is different, so that the luminance of the first pixel 110 and the second pixel 120 is different with the same scanning line 420 and the same data signal. Therefore, resolution of the pixel 100 is doubled when the scanning line 420 and the data line 410 remain unchanged. Without changing the data signal, the structure of the pixel 100 of this solution makes the resolution of the same image doubled from resolution A to resolution 2A. In particular, when a low-resolution image is viewed, the display panel 200 of this solution can be used to see more clearly. According to this solution, the color shift of a large viewing angle is not only improved, and under the same resolution, the scanning time for a single row is increased, so that the charging tune is also prolonged, and manufacturing costs of the display panel 200 are reduced. The pixels 100 on two sides have different luminance, and the pixel 100 at each side further includes main and auxiliary pixels 100 with different luminance, which can improve color shift. In addition, the design space of the display panel 200 and the degree of freedom in designing the display panel 200 are improved.

The first pull-down circuit 115 is arranged between the first auxiliary pixel electrode 114 and the next row of scanning lines 420 or the common electrode line 430, or arranged at other positions. The second pull-down circuit 125 is arranged between the second auxiliary pixel electrode 124 and the next row of scanning lines 420 or the common electrode line 430, or arranged at other positions.

In one or more embodiments, the first main pixel electrode 112 and the second main pixel electrode 122 have different patterns. The first auxiliary pixel electrode 114 and the second auxiliary pixel electrode 124 have different patterns.

In this solution, the patterns of the first main pixel electrode 112 and the second main pixel electrode 122 are different, and the patterns of the first auxiliary pixel electrode 114 and the second auxiliary pixel electrode 124 are different. Therefore, different domain can be set. Aperture ratios of the first auxiliary pixel electrode 114 and the second auxiliary pixel electrode 124 may be the same or different. Under the control of the same scanning line and when the same data signal is received, voltages of the first main pixel 111, the second main pixel 121, the first auxiliary pixel 113, and the second auxiliary pixel 123 are different, and the luminance is different. Therefore, the color shift of the display panel 200 is improved, and the design space and design freedom of the display panel 200 are improved, so that the scanning time for a single row is increased, and the charging time is increased. The first main pixel electrode 112 and the second main pixel electrode 122 may also be made of different materials or formed by using different processes, so that the aperture ratios of the first main pixel electrode 112 and the second main pixel electrode 122 are different.

In one or more embodiments, leakage currents of the first main switch T1 and the second main switch T4 are different. Leakage currents of the first auxiliary switch T2 and the second auxiliary switch T5 are different.

In this solution, the leakage currents of the first main switch T1 and the second main switch T4 are different, so that the final charging voltages of the first main pixel 111 and the second main pixel 121 are different, and the luminance of the first main pixel 111 and the second main pixel 121 is different without affecting the aperture ratio of the display panel 200. The leakage currents of the first auxiliary switch T2 and the second auxiliary switch T5 are different, so that the final charging voltages of the first auxiliary pixel 113 and the second auxiliary pixel 123 are different, and the luminance of the first auxiliary pixel 113 and the second auxiliary pixel 123 is different without affecting the aperture ratio of the display panel 200. Therefore, under the control of the same row of data lines and the same row of scanning lines, the pixel may include four pixel electrodes with different potentials. Based on such flexible arrangement of bright pixels and dark pixels, the color shift of the display panel 200 can be improved, the design space and design freedom of the display panel 200 is improved, thereby increasing the scanning time for a single row of the display panel 200, and increasing the charging time of the pixels.

As shown in FIG. 1 to FIG. 5, another embodiment of this application discloses a display panel 200. The display panel 200 includes: a first substrate 400: a plurality of pixels 100 arranged on the first substrate 400 and including a first pixel 110 and a second pixel 120; a plurality of data lines 410 arranged on the first substrate 400; a plurality of scanning lines 420 arranged on the first substrate 400; a spacer standing portion 440 arranged between two adjacent data lines 410 and at an intersection of four adjacent pixels 100; and a spacer 450 arranged corresponding to the spacer standing portion 440. The first pixel 110 and the second pixel 120 are connected to the $n^{th}$ row of data lines 410 and the $n^{th}$ row of scanning lines 420. The first pixel 110 includes a first main pixel 111 and a first auxiliary pixel 113 arranged adjacent to each other. The second pixel 120 includes a second main pixel 121 and a second auxiliary pixel 123 arranged adjacent to each other. The first main pixel 111 includes a first main pixel electrode 112, and the first auxiliary pixel 113 includes a first auxiliary pixel electrode 114. The second main pixel 121 includes a second main pixel electrode 122, and the second auxiliary pixel 123 includes a second auxiliary pixel electrode 124. The first main pixel electrode 112, the first auxiliary pixel electrode 114, the second main pixel electrode 122, and the second auxiliary pixel electrode 124 include a horizontal backbone 460 horizontally arranged and located corresponding to a position of the scanning line. The common electrode line 430 includes a first common electrode line 431 and a second common electrode line 432. The first common electrode line 431 is parallel to the data line 410 and arranged between the second pixel 120 of the $n^{th}$ row of data lines 410 and the $(n+1)^{th}$ row of data lines 410 along the scanning line 420. The second common electrode line 432 is overlapped with the horizontal backbone 460 and in communication with at least two first common electrode lines 431.

In this solution, since the first main pixel 111 and the first auxiliary pixel 113 of the first pixel 110 and the second main pixel 121 and the second auxiliary pixel 123 of the second pixel 120 are connected to the same data line and the same scanning line 420, the data lines 410 are reduced. The data lines 410 are arranged at intervals, so that space is freed up for arranging the spacer standing portion 440 at the intersection of the four pixels 100 and between adjacent data lines 410. A spacer 450 is arranged to improve uneven luminance (Mura) of a picture displayed by the display panel 200, and the loss of aperture ratios is reduced, which effectively improves the standing position of the spacer 450 in the display panel 200, so that the display effect and quality of the display panel 200 can be improved. Since the intersection of the scanning line 420 and the common electrode line 430 should be shielded, the spacer standing portion 440 is arranged at the intersection. Therefore, especially a black spacer standing portion 440 and the spacer 450 may be used as a shielding layer or a part of the shielding layer, to shield the scanning line 420 and the common electrode line 430, which can shield light while avoiding Mura, thereby reducing loss of light transmittance of the display panel 200 caused by arranging the spacer 450. Since the first common electrode lines 431 are easily disconnected during connection through the via 470 at the intersection, or the first common electrode lines on upper and lower sides of the intersection are disconnected themselves, a horizontal second common electrode line 432 is arranged, and the first common electrode lines 431 are formed into mesh structures that are in communication with each other, to ensure the function of the common electrode line 430. In addition, since the second common electrode line 432 and the horizontal backbone 460 of each of the pixels 100 overlap and share a wiring space, the loss of light transmittance can be reduced, and the light transmittance can be increased.

Figure 4:
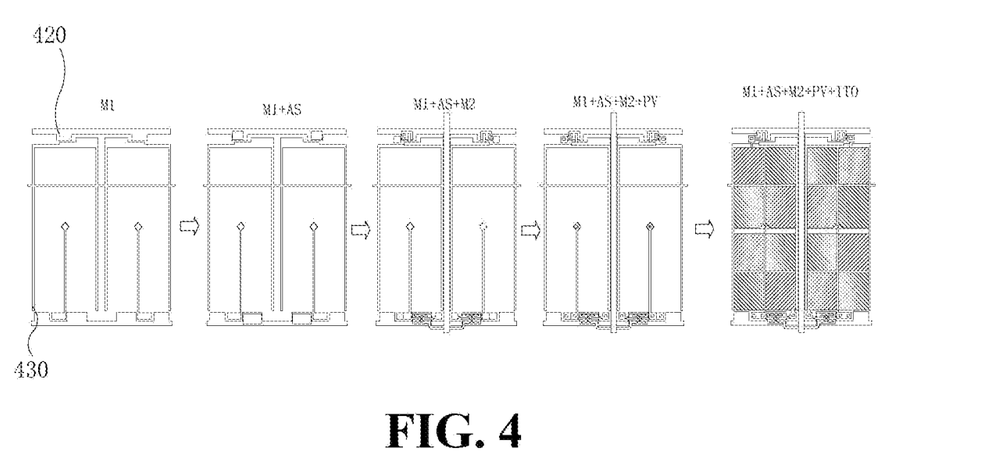
FIG. 4 is a schematic diagram of manufacturing a display panel according to an embodiment of this application.
Figure 5:
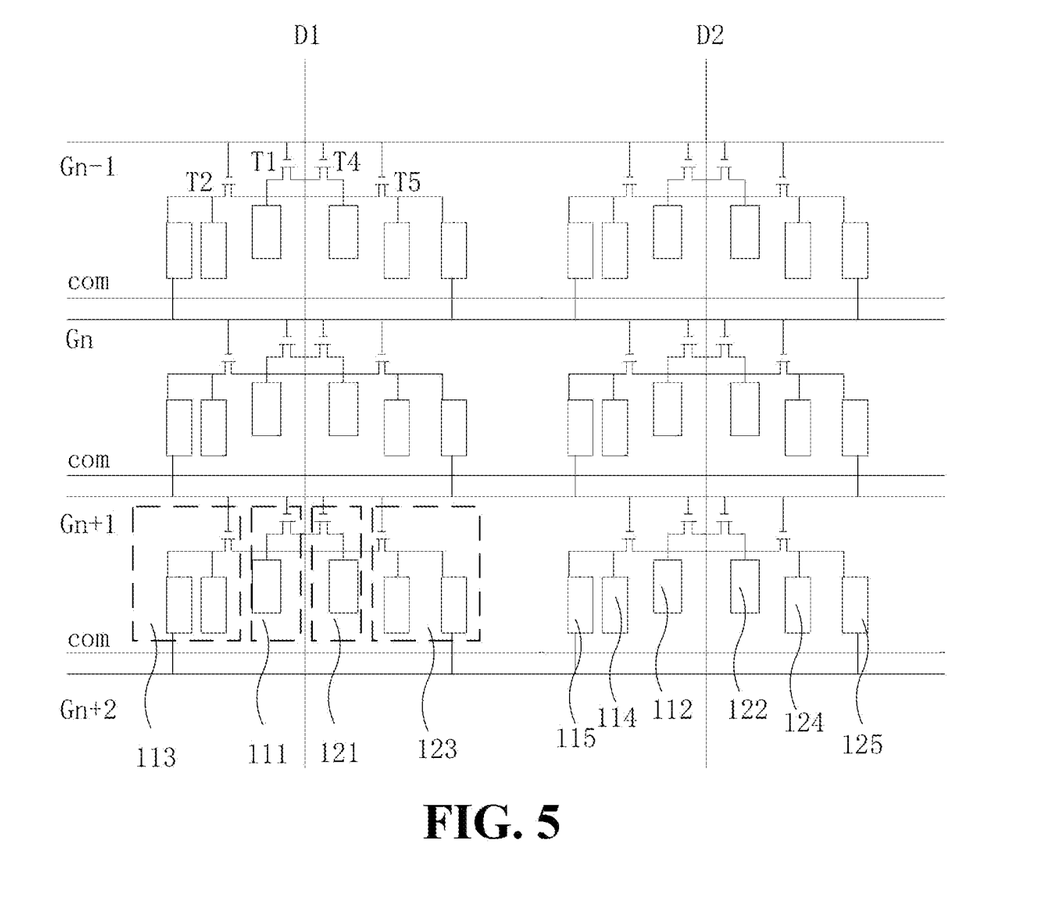
FIG. 5 is a schematic circuit diagram of another display panel according to an embodiment of this application.

In FIG. 4, M1 represents a first metal layer, AS represents a semiconductor layer, M2 represents a second metal layer, PV represents a via on a passivation layer, and ITO represents a pixel electrode.

Figure 6:
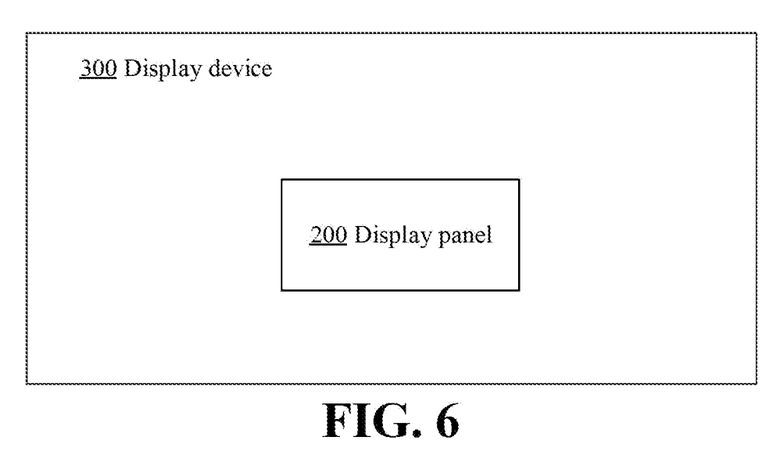
FIG. 6 is a schematic structural diagram of a display device according to an embodiment of this application.

As shown in FIG. 6, another embodiment of this application discloses a display device 300. The display device 300 includes the foregoing display panel 200.

The first substrate mentioned in this solution can be either a color filter substrate or an array substrate, as long as it is applicable.

The technical solution of this application can be widely applied to various display panels, such as a twisted nematic (TN) display panel, an in-plane switching (IPS) display panel, a vertical alignment (VA) display panel, and a multi-domain vertical alignment (MVA) display panel, or other types of display panels such as an organic light-emitting diode (OLED) display panel, which are all applied to the foregoing solution.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
a first substrate;
a plurality of pixels arranged on the first substrate and each comprising a first sub-pixel and a second sub-pixel;
a plurality of data lines arranged on the first substrate;
a plurality of scanning lines arranged on the first substrate;
a spacer standing portion arranged between two adjacent data lines and at an intersection of four adjacent pixels; and
a spacer arranged in the spacer standing portion, wherein the first sub-pixel and the second sub-pixel are connected to and driven by a same $n^{th}$ column of data line and a same $n^{th}$ row of scanning line, n being an integer no less than 1;
wherein the first sub-pixel comprises a first main sub-pixel and a first auxiliary sub-pixel arranged adjacent to each other; and the second sub-pixel comprises a second main sub-pixel and a second auxiliary sub-pixel arranged adjacent to each other;
wherein the first main sub-pixel and the first auxiliary sub-pixel are disposed on a left side of the respective data line and aligned in a same column, and the second main sub-pixel and the second auxiliary sub-pixel are disposed on a right side of the same data line and aligned in a same column, wherein the first main sub-pixel and the second main sub-pixel are aligned in a same row, and wherein the first auxiliary sub-pixel and the second auxiliary sub-pixel are aligned in a same row;
wherein the spacer standing portion is arranged between every two adjacent data lines at the intersection of four adjacent pixels and does not overlap any data line;
wherein the first sub-pixel and the second sub-pixel are turned on simultaneously.

2. The display panel according to claim 1, wherein a common electrode line is arranged between the second sub-pixel of the $n^{th}$ column of data line and the first sub-pixel of an $(n+1)^{th}$ column of data line; and
the spacer standing portion is located at an intersection of each scanning line and each common electrode line and is arranged on the respective scanning line.

3. The display panel according to claim 2, wherein the common electrode line is disconnected at the intersection of the common electrode line and each scanning line.

4. The display panel according to claim 2, wherein the common electrode line is connected through a via at the intersection of the common electrode line and each scanning line so as to be continuous.

5. The display panel according to claim 2, wherein the first main sub-pixel comprises a first main pixel electrode, the first auxiliary sub-pixel comprises a first auxiliary pixel electrode, the second main sub-pixel comprises a second main pixel electrode, and the second auxiliary sub-pixel comprises a second auxiliary pixel electrode;
the first main pixel electrode, the first auxiliary pixel electrode, the second main pixel electrode, and the second auxiliary pixel electrode each comprise a middle horizontal backbone parallel to the respective scanning line configured to drive the first sub-pixel and the second sub-pixel;
the common electrode line comprises a first common electrode line and a second common electrode line, the first common electrode line being parallel to the respective data line and arranged between the second sub-pixel of the $n^{th}$ column of data line and the first sub-pixel of the $(n+1)^{th}$ column of data line along the scanning line; and
wherein the second common electrode line is aligned with the horizontal backbones of the first main sub-pixel and the second main sub-pixel or aligned with the horizontal backbones of the first auxiliary sub-pixel and the second auxiliary sub-pixel, and wherein the second common electrode line is connected to at least two adjacent first common electrode lines.

6. The display panel according to claim 1, wherein a common electrode line is arranged between the second sub-pixel of the $n^{th}$ column of data line and the first pixel of an $(n+1)^{th}$ column of data line along the scanning line on the first substrate; and
the spacer standing portion is located at an intersection of the scanning line and each common electrode line and is arranged on the common electrode line; and
the scanning lines on two sides of the spacer standing portion are connected to each other through a via so as to be continuous.

7. The display panel according to claim 1, wherein the first main sub-pixel comprises a first main switch, the first auxiliary sub-pixel comprises a first auxiliary switch, the second main sub-pixel comprises a second main switch, and the second auxiliary sub-pixel comprises a second auxiliary switch,
the first auxiliary switch, the second auxiliary switch, the first main switch, and the second main switch being adjacently arranged at a position corresponding to the $n^{th}$ column of data line on the $n^{th}$ row of scanning line; and
a common electrode line is arranged between the second sub-pixel of the $n^{th}$ column of data line and the first sub-pixel of an $(n+1)^{th}$ column of data line along the scanning line on the first substrate,
the spacer being arranged on the common electrode line.

8. The display panel according to claim 1, wherein the first main sub-pixel comprises a first main switch, the first auxiliary sub-pixel comprises a first auxiliary switch, the second main sub-pixel comprises a second main switch, and the second auxiliary sub-pixel comprises a second auxiliary switch; and
the display panel further comprises an auxiliary spacer standing portion,
the auxiliary spacer standing portion being formed by adjacently arranging the first auxiliary switch, the second auxiliary switch, the first main switch, and the second main switch at an intersection of the $n^{th}$ row of scanning line and the $n^{th}$ column of data line.

9. The display panel according to claim 8, wherein the spacer standing portion is arranged at every other intersection of the scanning lines and each data line along the data line.

10. The display panel according to claim 9, wherein the spacer standing portion is arranged at every other intersection of each scanning line and the data lines along the scanning line.

11. The display panel according to claim 1, wherein the first auxiliary sub-pixel is connected to a first pull-down circuit configured to pull down a charging voltage of the first auxiliary sub-pixel, and the second auxiliary sub-pixel is connected to a second pull-down circuit configured to pull down a charging voltage of the second auxiliary sub-pixel, the first pull-down circuit and the second pull-down circuit having different pull-down effects.

12. The display panel according to claim 5, wherein the first auxiliary sub-pixel comprises a first auxiliary pixel electrode, and the second auxiliary sub-pixel comprises a second auxiliary pixel electrode, the first auxiliary pixel electrode and the second auxiliary pixel electrode having different patterns.

13. The display panel according to claim 7, wherein leakage currents of the first main switch and the second main switch are different; and
leakage currents of the first auxiliary switch and the second auxiliary switch are different.

14. A display device, comprising a display panel, the display panel comprising:
a first substrate;
a plurality of pixels arranged on the first substrate and each comprising a first sub-pixel and a second sub-pixel;
a plurality of data lines arranged on the first substrate;
a plurality of scanning lines arranged on the first substrate;
a spacer standing portion arranged between two adjacent data lines and at an intersection of four adjacent pixels, and
a spacer arranged in the spacer standing portion, wherein the first sub-pixel and the second sub-pixel are connected to and driven by a same $n^{th}$ column of data line and a same $n^{th}$ row of scanning line, n being an integer no less than 1;
wherein the first sub-pixel comprises a first main sub-pixel and a first auxiliary sub-pixel arranged adjacent to each other; and the second sub-pixel comprises a second main sub-pixel and a second auxiliary sub-pixel arranged adjacent to each other;
wherein the first main sub-pixel and the first auxiliary sub-pixel are disposed on a left side of the respective data line and aligned in a same column, and the second main sub-pixel and the second auxiliary sub-pixel are disposed on a tight side of the same data line and aligned in a same column, wherein the first main sub-pixel and the second main sub-pixel are aligned in a same row, and wherein the first auxiliary sub-pixel and the second auxiliary sub-pixel are aligned in a same row;
wherein the spacer standing portion is arranged between every two adjacent data lines at the intersection of four adjacent pixels and does not overlap any data line; wherein the first sub-pixel and the second sub-pixel are turned on simultaneously.

15. The display panel according to claim 5, wherein the first main pixel electrode, the first auxiliary pixel electrode each comprise a horizontal backbone and a vertical backbone intersecting at a center and dividing the respective pixel electrode into four domains, and a plurality of branches that are arranged in each of the four domains and that each start from a point on each of the horizontal backbone and the vertical backbone and that each extend in a direction away from both the horizontal backbone and the vertical backbone, the plurality of branches in each domain being parallel to each other and spaced apart from each other at regular intervals; wherein the horizontal backbone is a bisector of the vertical backbone and the vertical backbone is a bisector of the horizontal backbone; wherein the first main pixel electrode and the first auxiliary pixel electrode each have a union-jack shape;
wherein the second main pixel electrode and the second auxiliary pixel electrode each comprise a horizontal backbone and a vertical backbone intersecting at a center and dividing the respective pixel electrode into four domains, and a plurality of branches that are arranged in each of the four domains, wherein of the plurality of branches in each domain, the ones that are relatively closer to the center each start from a point on one of the horizontal backbone and the vertical backbone and extends to a point on the other of the horizontal backbone and the vertical backbone, and the ones that are relatively farther away from the center are each arranged parallel to the ones that are closer to the center; wherein the plurality of branches in each domain being parallel to each other and spaced apart from each other at regular intervals; wherein the horizontal backbone is a bisector of the vertical backbone and the vertical backbone is a bisector of the horizontal backbone.

16. The display panel according to claim 1, wherein the four adjacent pixels comprise a left-upper pixel, a left-lower pixel, a right-upper pixel, and a right-lower pixel, wherein the second auxiliary sub-pixel of the left-upper pixel, the second main sub-pixel of the left-lower pixel, the first auxiliary sub-pixel of the right-upper pixel, and the first main sub-pixel of the right-lower pixel are adjacent to each other; wherein the intersection of the four adjacent pixels is an intersection of the second auxiliary sub-pixel of the left-upper pixel, the second main sub-pixel of the left-lower pixel, the first auxiliary sub-pixel of the right-upper pixel, and the first main sub-pixel of the right-lower pixel that are adjacent to each other.

17. The display panel according to claim 2, wherein the spacer standing portion and the spacer are black and used as a shielding layer or a part of the shielding layer to shield the respective scanning line and common electrode line.

18. The display panel according to claim 2, wherein another light-shielding layer is additionally disposed at the intersection of the respective scanning line and common electrode line to shield the respective common electrode line, the respective scanning line, the respective standing portion, and the respective spacer, which share the light-shielding layer to increase a light transmittance.

19. The display panel according to claim 5, wherein the first main pixel electrode and the second main pixel electrode are made of different materials so that aperture ratios of the first main pixel electrode and the second main pixel electrode are different.

20. The display panel according to claim 5, wherein the first main pixel electrode and the second main pixel electrode are formed by using different processes so that aperture ratios of the first main pixel electrode and the second main pixel electrode are different.

* * * * *